US011813950B2

(12) United States Patent
O'Brien et al.

(10) Patent No.: US 11,813,950 B2
(45) Date of Patent: Nov. 14, 2023

(54) SYSTEM FOR STORING UNMANNED AERIAL VEHICLES (71) Applicant: Walmart Apollo, LLC, Bentonville, AR (US)

(72) Inventors: John J. O'Brien, Farmington, AR (US); Coleman Johnson, Bentonville, AR (US); Patricia Bird, Bentonville, AR (US); Robert Cantrell, Herndon, VA (US); Brian Mchale, Oldham (GB); Jeremy Varner, Bentonville, AR (US); Donald Ray High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 910 days.

(21) Appl. No.: 16/287,106

(22) Filed: Feb. 27, 2019

(65) Prior Publication Data
US 2019/0263538 A1 Aug. 29, 2019

Related U.S. Application Data (60) Provisional application No. 62/636,711, filed on Feb. 28, 2018.

(51) Int. Cl.
*H02J 7/00* (2006.01)
*H02J 7/14* (2006.01)
(Continued)

(52) U.S. Cl.
CPC .............. *B60L 53/31* (2019.02); *B64F 1/362* (2013.01); *H02J 7/0013* (2013.01); *H02J 7/0044* (2013.01); *B60L 2200/10* (2013.01)

(58) Field of Classification Search
CPC .. B64F 1/362; B64F 1/364; B64F 1/36; B60L 53/31; B60L 53/305; B60L 2200/10; H02J 7/025; H02J 7/0042–0045
(Continued)

(56) References Cited

U.S. PATENT DOCUMENTS 5,744,933 A * 4/1998 Inoue .................. G06Q 20/127
320/148
8,511,606 B1 8/2013 Lutke et al.
(Continued)

FOREIGN PATENT DOCUMENTS

CN 105863353 A 8/2016
CN 106275482 A 1/2017
(Continued)

OTHER PUBLICATIONS

International Search Report and Written Opinion dated May 8, 2019, issued in corresponding PCT Application No. PCT/US2019/019806.
(Continued)

*Primary Examiner* — Alexis B Pacheco
(74) *Attorney, Agent, or Firm* — Morgan, Lewis & Bockius LLP; Manita Rawat (57) ABSTRACT A system for storing one or more unmanned aerial vehicles is described herein. The system includes one or more shelves attached to a holding structure, the one or more shelves being configured to support one or more unmanned aerial vehicles (UAVs), the one or more shelves defining one or more shelf areas configured to receive the one or more unmanned aerial vehicles. The system also includes an electrical charging station configured to charge electrical batteries of the one or more unmanned aerial vehicles supported by the one or more shelves; and a data transfer and storage system configured to transfer and store data that is previously stored in a data storage device of the one or more unmanned aerial vehicles in a data storage unit.

20 Claims, 5 Drawing Sheets (51) Int. Cl.
*B60L 53/31* (2019.01)
*B64F 1/36* (2017.01)

(58) Field of Classification Search
USPC .......................................................... 320/109
See application file for complete search history.

(56) References Cited

U.S. PATENT DOCUMENTS

| | | | |
|---|---|---|---|
| 8,630,755 B2 | 1/2014 | Ohtomo et al. | |
| 9,238,414 B2 | 1/2016 | Ryberg et al. | |
| 9,384,668 B2 | 7/2016 | Raptopoulos et al. | |
| 9,457,915 B2 | 10/2016 | Wang | |
| 9,505,493 B2 | 11/2016 | Borko | |
| 9,540,121 B2 | 1/2017 | Byers et al. | |
| 9,680,317 B2* | 6/2017 | Roberts | A47B 81/00 |
| 9,815,633 B1* | 11/2017 | Kisser | B65G 37/02 |
| 10,220,964 B1* | 3/2019 | Sperindeo | B64C 39/02 |
| 10,432,001 B1* | 10/2019 | Bellis | A47B 57/045 |
| 10,453,021 B1* | 10/2019 | Evans | G06Q 10/083 |
| 10,457,392 B1* | 10/2019 | Evans | G06Q 10/083 |
| 10,554,059 B1* | 2/2020 | Hemingway | F21V 23/003 |
| 2003/0141840 A1* | 7/2003 | Sanders | H02J 7/0044 |
| | | | 320/107 |
| 2009/0157907 A1* | 6/2009 | Chapman | H02J 7/0013 |
| | | | 710/8 |
| 2010/0176762 A1* | 7/2010 | Daymude | H02J 7/0044 |
| | | | 320/110 |
| 2011/0301748 A1* | 12/2011 | Lecarpentier | H04M 19/08 |
| | | | 320/137 |
| 2012/0078413 A1* | 3/2012 | Baker, Jr. | G07F 17/12 |
| | | | 700/232 |
| 2015/0183326 A1* | 7/2015 | Ryberg | B60L 53/80 |
| | | | 320/109 |
| 2016/0233701 A1* | 8/2016 | Gliatis | H02J 7/0013 |
| 2016/0300424 A1* | 10/2016 | Jones | G07F 15/005 |
| 2016/0302332 A1* | 10/2016 | Anderson | H05K 9/0015 |
| 2016/0364989 A1 | 12/2016 | Speasl et al. | |
| 2016/0376031 A1 | 12/2016 | Michalski et al. | |
| 2017/0081043 A1 | 3/2017 | Jones et al. | |
| 2017/0113815 A1* | 4/2017 | James | B64F 1/12 |
| 2017/0158353 A1* | 6/2017 | Schmick | G05D 1/0033 |
| 2017/0177031 A1* | 6/2017 | Lesizza | H01R 24/76 |
| 2017/0225802 A1* | 8/2017 | Lussier | E04H 12/18 |
| 2017/0283090 A1 | 10/2017 | Miller et al. | |
| 2018/0072170 A1* | 3/2018 | Evans | B60L 53/60 |
| 2018/0186473 A1* | 7/2018 | Erickson | B60L 53/665 |
| 2018/0229859 A1* | 8/2018 | Evans | H02J 7/0044 |
| 2018/0263557 A1* | 9/2018 | Kahlman | H04B 5/0012 |
| 2019/0002127 A1* | 1/2019 | Straus | G08G 5/0091 |
| 2019/0006862 A1* | 1/2019 | Hamilton, IV | G07F 15/006 |
| 2019/0023133 A1* | 1/2019 | Renold | B64F 1/007 |
| 2019/0039752 A1* | 2/2019 | Venturelli | B60L 53/50 |
| 2019/0383052 A1* | 12/2019 | Blake | B60L 53/12 |
| 2020/0017210 A1* | 1/2020 | Neubecker | B64C 39/02 |
| 2020/0373767 A1* | 11/2020 | Schweitzer | H02J 7/00036 |
| 2021/0206511 A1* | 7/2021 | Werner | B60L 53/00 |

FOREIGN PATENT DOCUMENTS

| | | | | |
|---|---|---|---|---|
| CN | 111622570 A | * | 9/2020 | B60L 53/80 |
| EP | 3241747 A1 | | 11/2017 | |
| WO | WO-2017109780 A1 | * | 6/2017 | B60L 53/38 |

OTHER PUBLICATIONS

"Dronebox", H3 Dynamics, pp. 1-4.
"A Wireless Charging Station in Any Form", Humavox, Feb. 16, 2017, pp. 1-7.
"Drone Protective Hangar", Skysense, the Skyport, pp. 1-3.

* cited by examiner

SYSTEM FOR STORING UNMANNED AERIAL VEHICLES

CROSS-REFERENCE TO RELATED APPLICATIONS

The present patent application claims priority benefit to U.S. Provisional Application No. 62/636,711 filed on Feb. 28, 2018, the entire content of which is incorporated herein by reference.

BACKGROUND

1. Technical Field

The present disclosure relates generally to unmanned aerial vehicles and more specifically to a system for storing unmanned aerial vehicles (UAVs).

2. Introduction

Unmanned Aerial Vehicles (UAVs), commonly known as drones, are becoming ubiquitous. UAVs are increasingly used in aerial imagery and photography, for surveillance, commercial applications, real-estate applications, scientific applications, equipment inspections, agricultural applications, military applications, and recreational applications. UAVs are also contemplated as transport vehicles for delivering goods such as packages. An UAV is an aircraft that is piloted without a human pilot aboard the aircraft. The UAV can be operated using a remote control device by a human operator. The UAV can also be operated autonomously by an onboard programmed or programmable computer(s) programmed to execute a specific series of commands or instructions to control the UAV.

There are currently no adequate storage systems for UAVs. Currently, there are no known storage systems where information stored in the electronic data storage device of the UAV can be off loaded or transferred and/or where a battery system of the UAV can be recharged after usage.

Therefore, there is a need for a novel system that cure the above deficiencies by providing a novel storage system for UAVs.

SUMMARY

An aspect of the present disclosure is to provide a system for storing one or more unmanned aerial vehicles. The system includes one or more shelves attached to a holding structure, the one or more shelves being configured to support one or more unmanned aerial vehicles (UAVs), the one or more shelves defining one or more shelf areas configured to receive the one or more unmanned aerial vehicles. The system further includes an electrical charging station configured to charge electrical batteries of the one or more unmanned aerial vehicles supported by the one or more shelves; and a data transfer and storage system configured to transfer and store data that is previously stored in a data storage device of the one or more unmanned aerial vehicles in a data storage unit.

Another aspect of the present disclosure is to provide a system for storing an unmanned aerial vehicle. The system includes a storage container configured to store an unmanned aerial vehicle, the storage container having a base and a lid covering the base. The system further includes a charging connector in the storage container, the charging connector being configured to electrically connect batteries of the one or more unmanned aerial vehicles inside the storage container to an electrical energy source outside of the storage container. The system also includes a data connector configured to connect a data storage device of the UAV inside the storage container to a storage unit outside of the storage container to enable transfer of data between the data storage device of the UAV and the storage unit.

Additional features and benefits of the disclosure will be set forth in the description which follows, and in part will be obvious from the description, or can be learned by practice of the herein disclosed principles. The features and benefits of the disclosure can be realized and obtained by means of the instruments and combinations particularly pointed out in the appended claims. These and other features of the disclosure will become more fully apparent from the following description and appended claims, or can be learned by the practice of the principles set forth herein. It is to be expressly understood, however, that the drawings are for the purpose of illustration and description only and are not intended as a definition of the limits of the disclosure.

DETAILED DESCRIPTION

Figure 1:
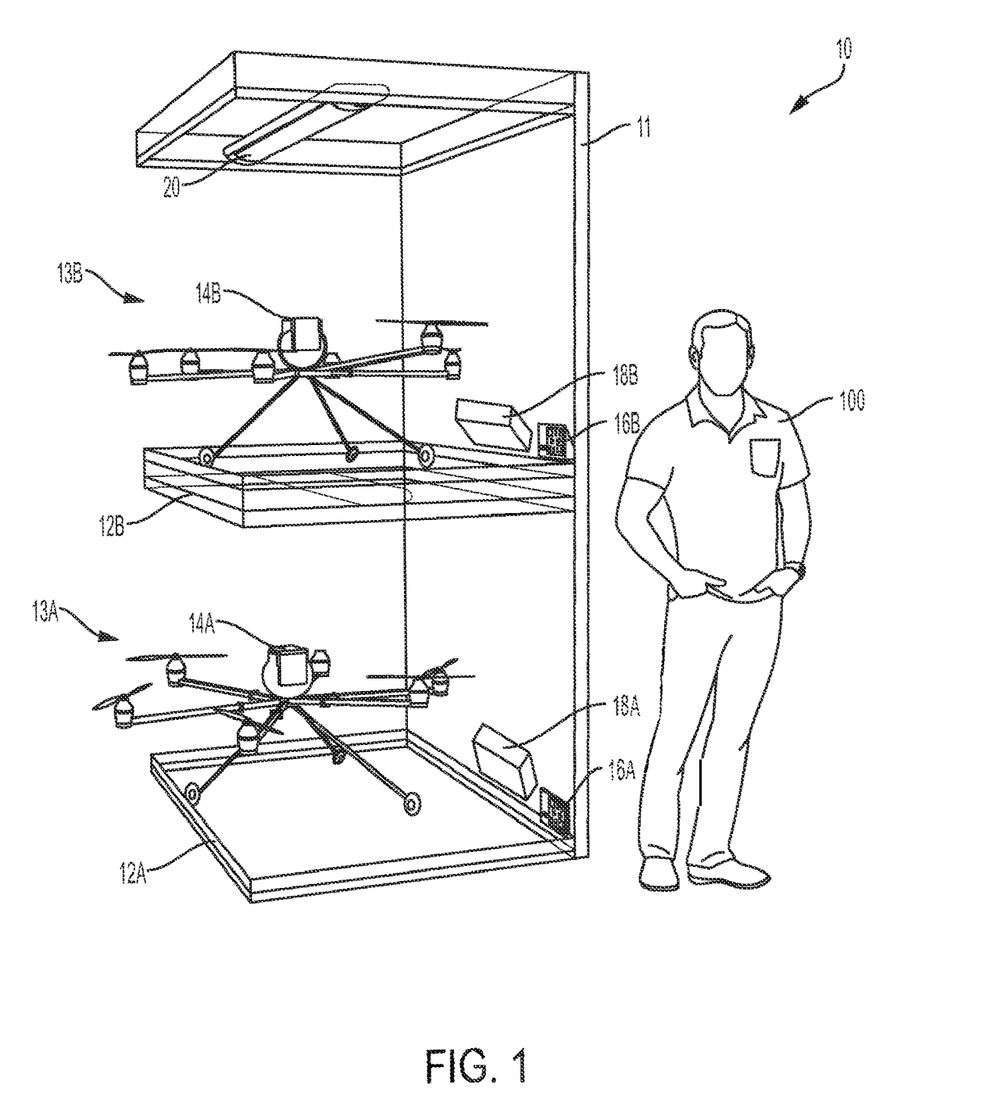
FIG. 1 shows a system for storing one or more unmanned aerial vehicles, according to an embodiment of the present disclosure.

FIG. 1 shows a system for storing one or more unmanned aerial vehicles, according to an embodiment of the present disclosure. The storage system 10 comprises one or more shelves 12A, 12B attached to a holding structure 11. Each of the one or more shelves 12A, 12B (e.g., two shelves) is configured to support one or more UAVs 14A, 14B (e.g., two UAVs). For example, as shown in FIG. 1, shelf 12A is configured to support or hold UAV 14A and shelf 12B is configured to support or hold UAV 14B. The one or more shelves 12A, 12B define shelf areas 13A and 13B configured (e.g., sized) to receive the one or more UAVs 14A, 14B, respectively. The shelf areas 13A and 13B can be configured to protect the UAVs 12A, 12B from natural disasters and to keep the UAVs 12A and 12B more secure to prevent damage to the UAVs 12A and 12B. For example, the shelves 12A, 12B can be provided with a slightly elevated edges or sides to prevent the UAVs 14A, 14B from rolling over the edge of the shelves 12A, 12B. Walls can also be provided to enclose the shelf areas 13A, 13B so as to keep the UAVs 14A, 14B safely stored. For example, the shelf areas 13A and/or 13B can be enclosed on lateral sides by walls while one lateral side can be left open to allow access to the shelf areas 13A and/or 13B to store the one or more UAVs 14A, 14B.

In an embodiment, each shelf area 13A, 13B of the storage system 10 can be provided with an electrical charging station 16A, 16B for charging batteries of the corresponding UAV 14A, 14B located on corresponding shelf area 13A, 13B. The electrical charging stations 16A and 16B may include a cooling system for cooling the batteries during the charging process. In general, the electrical charging stations 16A and 16B can be temperature controlled to keep the batteries cool. In an embodiment, each shelf area 13A, 13B is also provided with a data transfer and storage system (e.g., hard drives (HDDs) or solid state drives (SSDs)) 18A, 18B for transferring and storing data that is stored in data storage devices (e.g., SD memory cards, flash drive) of the corresponding UAV 14A, 14B located on corresponding shelf area 13A, 13B. For example, data from a previous flight of the UAVs 12A and 12B stored in the data storage device (e.g., SD memory card) of each of the UAVs 12A and 12B can be read by and transferred to the data transfer and storage system 18A and 18B for later analysis. Similarly, the data transfer and storage system 18A and 18B can be provided with a cooling system to regulate a temperature of the storage system 18A and 18B. In an embodiment, the electrical charging stations 16A and 16B and the data transfer and storage systems 18A and 18B can use the same or different cooling and/or temperature control systems. For example, an air cooling system (e.g., one or more fans or blowers) and/or a liquid cooling system (e.g., circulating water or other fluid) can be used to cool the electrical charging stations 16A, 16B and the data transfer and storage systems 18A and 18B.

In an embodiment, the batteries of the UAVs 14A, 14B can also house the data storage device (e.g., SD memory card). In which case the data accrued during flight and stored in the data storage device (e.g., SD memory card) of the UAV 14A, 14B can be transferred to the data transfer and storage system 18A, 18B while the batteries of the UAVs 14A, 14B are being recharged. For example, the battery of the UAV 14A, 14B can be provided with a compartment to house the data storage device of the UAV 14A, 14B. A same port or two separate ports can be provided on the battery for charging the battery and for transferring data.

In another embodiment, transferring the data from the data storage device (e.g., SD memory card) of the UAV 14A, 14B to the data transfer and storage systems 18A and 18B of the UAV storage system 10 can be performed wirelessly (e.g., using WIFI, BLUETOOTH, etc.). In this case, the data storage device of the UAVs 14A, 14B can be left on the UAV and the transfer of data can be accomplished through a wireless connection between the UAV 14A, 14B and the data transfer and storage system 18A, 18B. In yet another embodiment, the transfer of data can be accomplished through a wireless connection between the UAV 14A, 14B and a common data transfer and storage system 18A, 18B common to all UAVs. For example, a Network Attached Storage (NAS) can be used as the data transfer and storage system 18A, 18B and all UAVs 14A, 14B can transfer their data to the same NAS. The NAS can be located near the UAV storage system 10 or can also be located at a remote storage location.

In an embodiment, the charging of the battery on the UAVs 14A, 14B can also be performed wirelessly (i.e., cordless charging), for example through an inductive coupling. In which case, the battery of the UAV need not be directly electrically connected to the electrical charging station 16A, 16B. For example, the battery of the UAV 14A, 14B need not be removed from the UAV 14A, 14B as electric charge can be transferred from the electrical charging station 16A, 16B to the battery on the UAV 14A, 14B. For example, in an embodiment, an inductive coupling charging unit can be provided on the shelves 12A and 12B so as to charge the batteries of the UAVs 14A, 14B upon landing on the shelves 12A and 12B.

The storage system 10 can also be provided with lighting systems 20 for providing light to illuminate the shelf areas 13A and 13B to allow a user 100 to inspect the UAVs 12A and 12B. The storage system 10 can also be provided with various detection systems, including thermal sensors, X-Ray systems, ultrasound, visualization cameras (in the visible or infrared wavelength ranges), etc., to allow the user 100 to inspect the structure or components of the UAV 14A, 14B.

Figure 2:
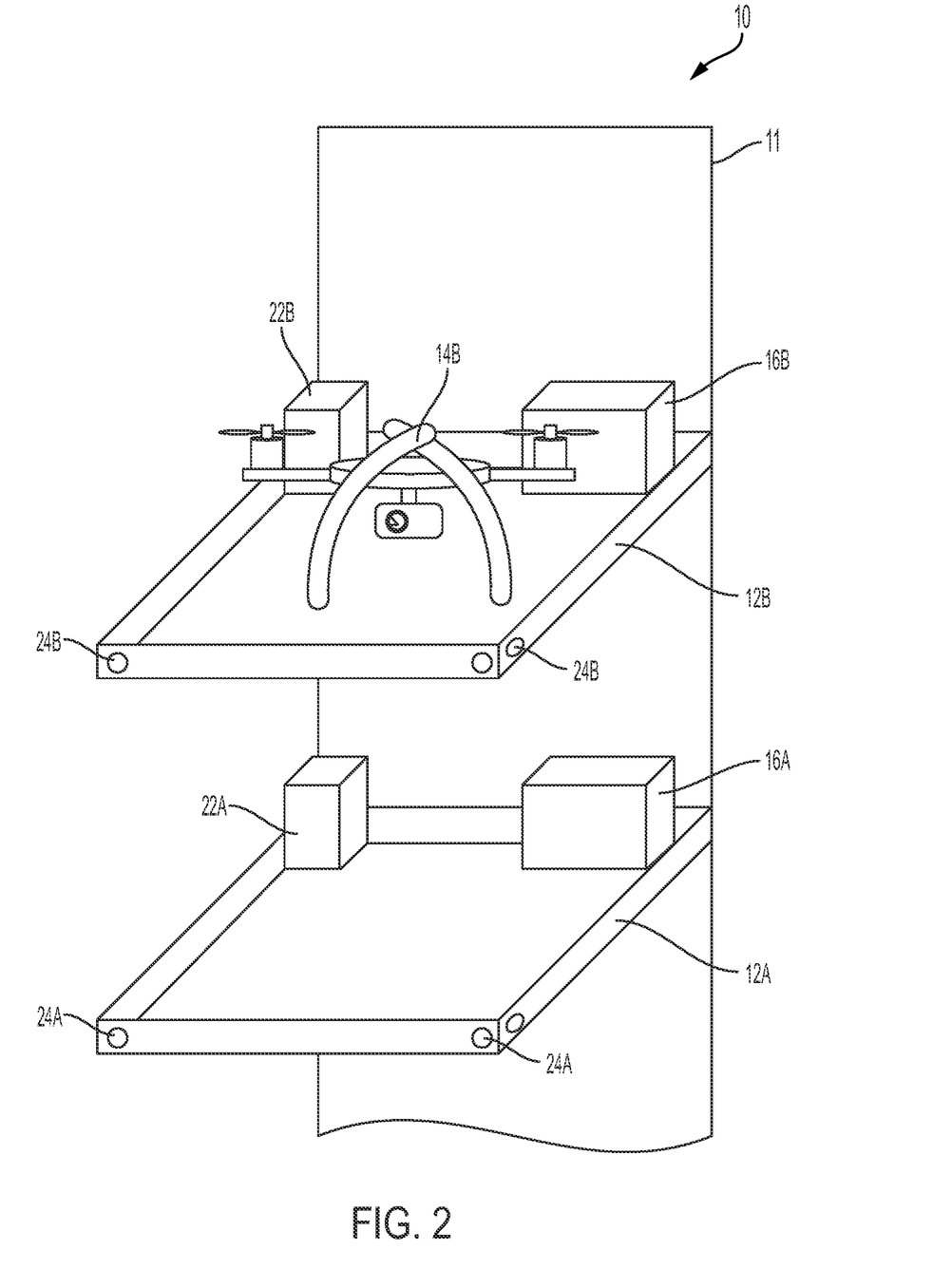
FIG. 2 depicts schematically a storage system for UAVs, according to another embodiment of the present disclosure.

FIG. 2 depicts schematically a storage system for UAVs, according to another embodiment of the present disclosure. In addition to the various features described above with respect to FIG. 1, the storage system 10 can further include a spare parts container 22A, 22B. The spare parts container 22A can be provided on shelf 12A and the spare parts container 22B can be provided on shelf 12B. The spare part containers 22A, 22B may contain spare parts for the UAV 14A, 14B, respectively. The spare parts can be, for example, blades, rotors, new batteries, etc. The spare parts can be used during repair or maintenance of the UAV 14A, 14B when needed. The storage system 10 may also include indicator lights 24A, 24B. Indicator lights 24A can be provided on shelf 12A and indicator lights 24B can be provided on shelf 12B. The indicator lights 24A, 24B can be used to indicate the location of an edge of the shelves, 12A, 12B so that the UAV 14A, 14B can fly towards the shelf 12A, 12B while avoiding collision with the edge of the shelf 12A, 12B. The indicator lights 24A, 24B can be steady lights or blinking lights. For example, the indicator lights 24A, 24B can emit light in different colors depending on the position of the shelf or depending on the side of the shelf on which the indicator lights are mounted.

In an embodiment, for example, the UAVs 14A, 14B can be programmed to fly to their corresponding shelf areas 13A and 13B for storage, recharging of the batteries of the UAVs 14A, 14B using electrical charging stations 16A, 16B and/or transfer of data from the data storage device of the UAV to the data transfer and storage systems 18A, 18B. For example, the UAVs 14A, 14B can use their camera and the indicator lights 24A, 24B to guide the UAVs 14A, 14B in their approach to landing on the shelfs 12A, 12B in a similar fashion as an aircraft (e.g., a piloted airplane) uses the lights on the airport landing strip to guide the approach and landing of the plane on the landing strip. Although two shelves 12A, 12B are depicted in FIGS. 1 and 2, as it can be appreciated more than two shelves can be provided. In addition, the shelves can be juxtaposed to form a row of shelves for storing a large number of UAVs (e.g., hundreds).

Figure 3A:
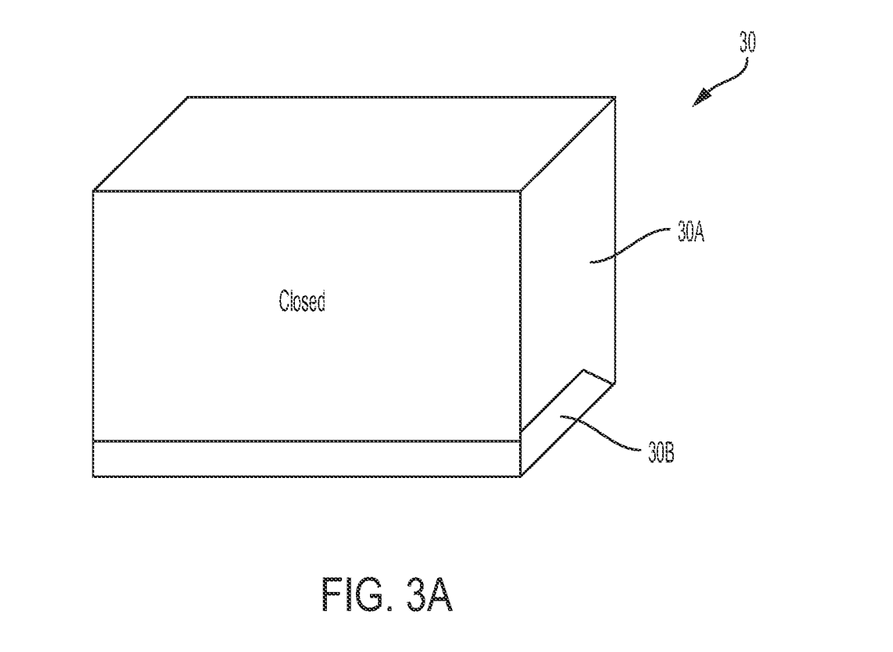
FIG. 3A depicts a storage system for an UAV including a storage container, according to another embodiment of the present disclosure.
Figure 3B:
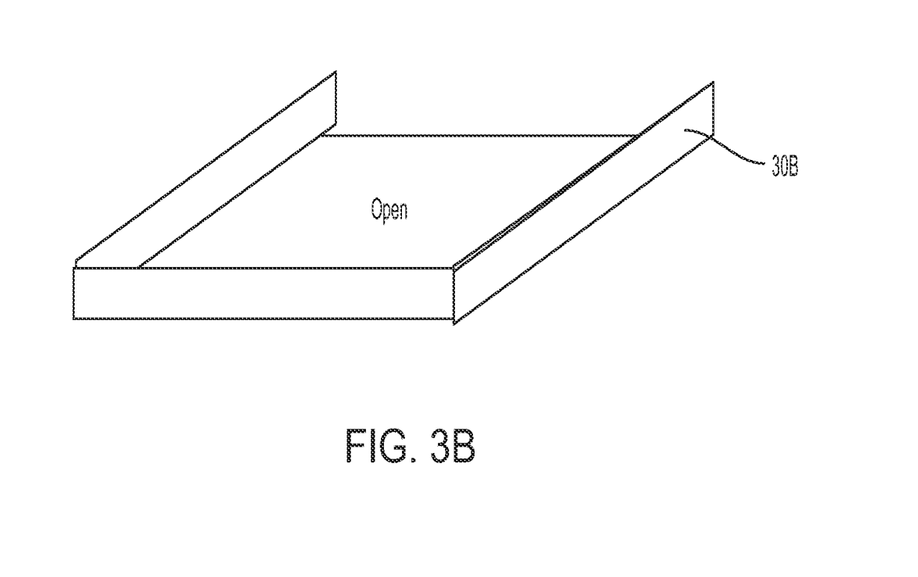
FIG. 3B depicts a base of the storage container shown in FIG. 3A, according to an embodiment of the present disclosure.

FIG. 3A depicts a storage system for an UAV, according to another embodiment of the present disclosure. In this embodiment, the storage system comprises a storage container 30 configured (e.g., sized and shaped) to store an UAV, for example UAV 14A, 14B shown in FIG. 1. In an embodiment, the storage container 30 can have a clamshell configuration and can include a base 30B and a lid 30A that is configured to cover the base 30B. In an embodiment, the lid 30A can be connected to the base 30B via one or more hinges. However, the lid 30A can also be not hinge-connected to the base 30B. FIG. 3B depicts the base 30B of the storage container 30, according to an embodiment of the present disclosure. An UAV, for example UAV 14A, 14B shown in FIG. 1, can be placed on the base 30B and the lid 30A can be placed on top of the base 30B to contain the UAV inside the storage container 30. In an embodiment, the storage container 30 can be configured to house a single UAV (e.g., UAV 14A) to secure the UV inside the storage container 30. A plurality of storage containers 30 can be used to store a plurality of UAVs. In an embodiment, the base 30B and/or the lid 30A can be opaque, semi-transparent or transparent. For example, the base 30B and/or the lid 30A or a portion of the base 30B and/or a portion of the lid 30A can be made of a transparent material, which can allow a user to see the UAV inside the storage container 30.

In an embodiment, a size of the storage container 30 can be selected so that the UAV (e.g., UAV 14A, 14B) can snuggly fit inside the storage container 30. For example, this allows for the UAV 14A, 14B to remain assembled when stored inside the storage container 30. In addition, this can provide a secure housing to the UAV 14A, 14B to prevent damage to the UAV 14A, 14B. The storage container 30 can also include a charging connector for charging a battery of the UAV 14A, 14B and a data connector for the data transfer and storage of data offloaded from the data storage device of the UAV (e.g., SD memory card). The connection can provide for pass-through testing of the UAV while in storage, digital monitoring, digital maintenance and charging of UAV batteries. The charging connector in the storage container is configured to electrically connect the batteries of the UAV 14A, 14B when inside the storage container 30 to an electrical energy source outside of the storage connector 30. The data connector is configured to connect the data storage device of the UAV 14A, 14B when inside the storage container 30 to a storage unit outside of the storage container 30 to enable transfer of data between the data storage device of the UAV 14A, 14B and the storage unit. In an embodiment, the charging connector and/or the data connector can be provided on the base 30B of the storage container 30. However, the charging connector and/or the data connector can also be provided on the lid 30A of the storage container 30.

In another embodiment, a battery storage and charging station may be provided inside the storage container 30. The battery charging station in the storage container 30 can be configured to be "explosion proof" in the event of a battery mishap. In an embodiment, frequently used spare parts, such as propellers, sensors, cameras, etc., for the UAV 14A, 14B can be stored in the storage container 30. In an embodiment, the storage container 30 can include one or more security systems to secure the UAV 14A, 14B so that only authorized individuals have access to the UAV 14A, 14B. For example, the security system can be configured to send out an alert if the security system is tampered with and/or the storage container 30 is force-opened or tampered with by an unauthorized individual. In an embodiment, the storage container 30 may also be provided with a fire-alarm system to detect and warn through a signal (visual or sound or both) of the presence or ignition of fire inside the storage container 30. For example, the fire may originate from overheated batteries of the UAV 14A, 14B. For example, the storage container 30 may be provided with an internal temperature sensing unit to monitor a temperature inside of the storage container 30.

In an embodiment, the storage container 30 may also include a data transfer and storage system to transfer or off load data from the data storage device of the UAV (e.g., SD memory card) to a data storage unit inside the storage container 30. The transferred and stored data on the data storage unit inside the storage container 30 can provide pre-flight and post-flight checks for the UAV 14A, 14B by analyzing the data transferred from the data storage device (e.g., SD memory card) of the UAV 14A, 14B. In an embodiment, the transfer of data from the data storage device of the UAV 14A, 14B inside the storage container 30 can be performed wirelessly. In which case, the data storage unit inside the storage container 30 may not be needed as the data can be transferred into a remote location or central data storage location that may be shared by a plurality of UAVs. For example, the shared storage location may be a Network Attached Storage (NAS) unit which can be configured to receive data from the data storage device (e.g., SD memory card) of each UAV 14A, 14B. In an embodiment, BLUETOOTH or WIFI wireless communication can be enabled for short range communications from the UAV to a handheld device (e.g., smartphone, tablet, laptop, etc.) for troubleshooting and maintaining the drones.

In an embodiment, the storage container 30 may include automatic opening/closing sides so that the UAV 14A, 14B can be secured. In an embodiment, a structure of the storage container 30 may further provide radiofrequency (RF) shielding to protect against RF interference. In an embodiment, UAV 14A, 14B may fly into and out of the storage container 30 autonomously guided by position sensors (e.g., camera, lasers, RF or ultrasound signals, etc.) on the UAV and/or guided by position sensors or systems provided on the storage container 30 such as blinking lights, lasers, etc. In an embodiment, a detailed localization grid may enable for the precise positioning of the UAVs (e.g., UAV 14A, 14B) and storage containers 30 within a storage facility wherein a plurality of storage containers 30 are stored.

Figure 4:
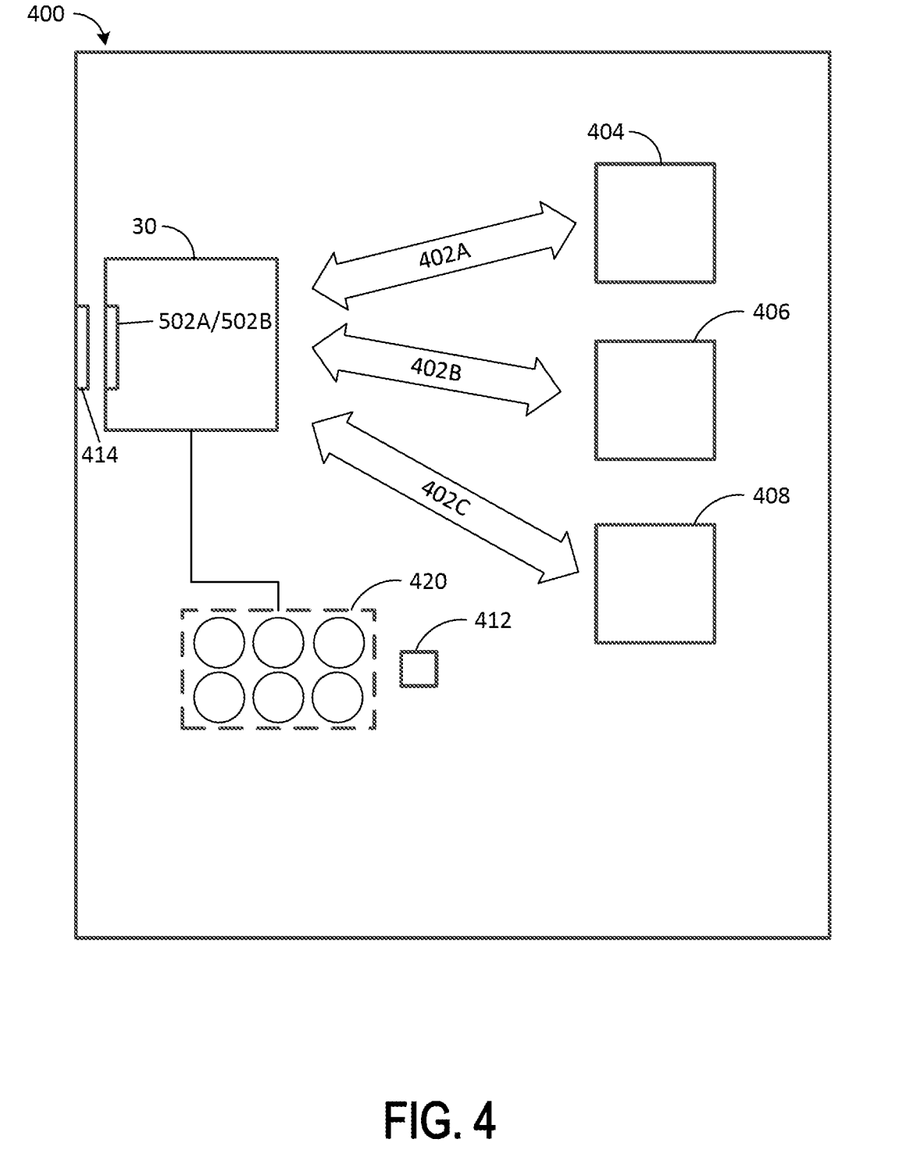
FIG. 4 depicts a conveyance system and storage facility, in accordance with some embodiments.
Figure 5:
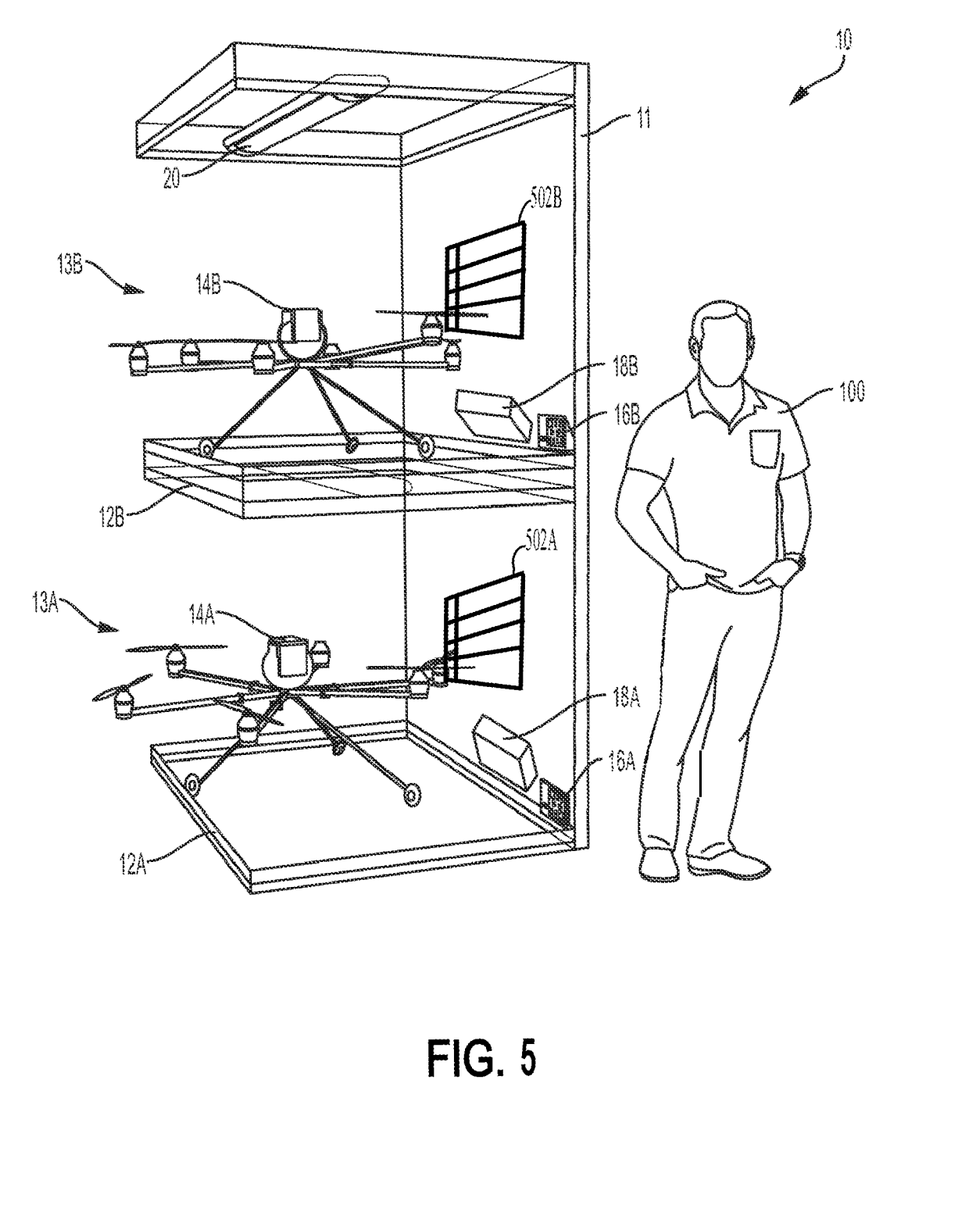
FIG. 5 shows a system for storing one or more unmanned aerial vehicles including a system for cooling, according to an embodiment of the present disclosure.

In an embodiment, the storage container 30 can be configured to be handled by a conveyance system 402 (e.g., conveyance system 402A, 402B, and 402C) and stored at a storage facility 400. The storage facility 400 is configured to store a plurality of storage containers 30. For example, after completing a mission, the UAV 14A, 14B can approach the storage facility 400 having a plurality of storage containers and enter a storage container 30. After closing the storage container 30 and securing the UAV 14A, 14B inside the storage container 30, the storage container 30 containing the UAV 14A, 14B can then be conveyed by the conveyor system 402, such as conveyor system 402A, to a first testing area 404 where the data from the mission can be retrieved and evaluated. In the first testing area 404, various sensors and camera(s) of the UAV 14A, 14B can be tested and checked if working properly. The power of the batteries of the UAV 14A, 14B can also be tested and the batteries recharged if needed. Other tests may also be performed on the UAV 14A, 14B including determining RF signal communication strength, latency, etc. The storage container 30 container the UAV 14A, 14B can then be conveyed using the conveyance system 402, such as conveyor system 402B, to a second testing station where other sensors can assess a structural integrity of the airframe of the UAV 14A, 14B. For example, X-rays, ultrasound and cameras can be used to determine the structural integrity of the airframe of the UAV 14A, 14B. In an embodiment, the storage container 30 can be provided with at least a transparent portion so that one or more of the tests can be conducted or observed with the storage container 30 closed. The storage container 30 containing the UAV 14A, 14B can then be conveyed using the conveyance system 402, such as conveyor system 402C, to a third testing area where spin up the propellers of the UAV 14A, 14B may be performed so as to monitor the vibration of the UAV 14A, 14B. For example, if vibration levels measured by vibration sensors exceed a threshold, one or more propeller(s) of the UAV 14A, 14B may be replaced. In an embodiment, the storage facility 400 may include a plurality of battery charging container locations 408. Each charging location 408 in the storage facility can be provided with a battery charging connection to connect to the charging connector provided in the storage container 30 which in turn is connected the battery of the UAV 14A, 14B within the storage container 30. In an embodiment, the charging location 408 in the storage facility can also include a system 414 for cooling the UAV 14A, 14B inside the storage container 30. In an embodiment, air ducts may be aligned with vents 416 (e.g., vents 502A and 502B of FIG. 5) provided in the storage container 30 for this purpose. In an embodiment, the charging location 408 or another location in the storage facility may also be provided with data transfer and offloading system to transfer the data stored inside a data storage device of the UAV 14A, 14B to another storage unit outside of the UAV 14.A, 14B and outside of the storage container 30 containing the UAV 14A, 14B. In an embodiment, the storage facility may further include a station 410 for performing software updates. This station 410 can be the same or different from the location where charging of the batteries of the UAV 14A, 14B and/or transferring the data from the data storage device of the UAV 14A, 14B is performed. Finally, in an embodiment, after all the testing, maintenance and charging is complete, the storage container 30 containing the UAV 14A, 14B can then be moved to a storage area in the storage facility to await a next mission.

In an embodiment, the conveyance system 402 (e.g., conveyance system 402A, 402B, and 402C) may include an automated guided vehicle (AGV), a robot, or conveyor belt, etc., for transporting the storage container 30 containing the UAV 14.A, 14B to its intended location in the storage facility for UAVs. In an embodiment, a transportation system (not shown in FIG. 4), such as the automated guided vehicle (AGV) or robot, can be used to transport the UAV 14A, 14B into its intended storage container 30. In an embodiment, the landing gear of the UAV can fold after landing for ease of handling by the transportation system.

In an embodiment, a distributed ledger of who worked on which UAV 14A, 14B can be maintained using blockchain. A blockchain based system can also be used for tracking which UAV is in which storage container 30 and what mission or missions the UAV 14A, 14B has undergone. The blockchain based system can also track where each storage container 30 is in the storage facility.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Although the embodiments of disclosure have been described in detail for the purpose of illustration based on what is currently considered to be the most practical, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed:

1. A system for storing an unmanned aerial vehicle comprising:
   one or more shelves attached to a holding structure, each shelf of the one or more shelves (i) being configured to support a storage container configured to store an unmanned aerial vehicle (UAV), and (ii) defining a shelf area configured to receive the UAV, wherein the storage container includes a lid covering a top portion of at least one of the one or more shelves, at least a portion of the lid or at least a portion of the shelf is semi-transparent or transparent;
   a charging connector in the storage container, the charging connector being configured to electrically connect one or more batteries of the UAV of each of the one or more shelves to an electrical energy source outside of the storage container, while the UAV is being supported by the corresponding shelf;
   for each shelf of the one or more shelves, a data connector configured to connect a data storage device of the UAV to a storage unit outside of the storage container, the data connector being further configured to transfer flight data accrued during a flight of the UAV between the data storage device of the UAV and the storage unit, while the UAV is being supported by the corresponding shelf, the flight data including data characterizing information of a mission; and
   a detection system configured to enable inspection of a structure of at least one UAV,
   wherein the storage container is configured to be handled by a conveyance system and conveyed to one or more testing areas such that the UAV can be evaluated.

2. A system for storing an unmanned aerial vehicle comprising:
   a storage container including a base and a lid covering a top portion of the base, the base being configured to support an unmanned aerial vehicle (UAV);
   a charging connector in the storage container, the charging connector being configured to electrically connect one or more batteries of the UAV of the base to an electrical energy source outside of the storage container, while the UAV is being supported by the base; and
   for the UAV, a data connector configured to connect a data storage device of the UAV to a storage unit outside of the storage container, the data connector being further configured to enable transfer flight accrued during a flight of the UAV data between the data storage device of the UAV and the storage unit, while the UAV is being supported by the base, the flight data including data characterizing information of a mission,
   wherein the storage container is configured to be handled by a conveyance system and conveyed to one or more testing areas such that the UAV can be evaluated.

3. The system according to claim 2, wherein the storage container comprises one or more security systems to secure the UAV, the one or more security systems being configured to send out an alert if the security system is tampered with or if a storage system is force-opened or tampered with.

4. The system according to claim 2, further comprising a data transfer and a storage system to transfer data from a data storage device of the UAV to a data storage unit inside the storage container.

5. The system according to claim 2, wherein a structure of the storage container is configured to provide radiofrequency (RF) shielding to protect the UAV against RF interference.

6. The system according to claim 2, wherein the storage container is configured to be handled by a conveyance system and stored in a storage facility configured to store a plurality of storage containers.

7. The system according to claim 2, wherein the storage container including the UAV is conveyed by a conveyance system to a first testing area in a storage facility, the flight data is evaluated when the UAV is within a first testing area.

8. The system according to claim 7, wherein the storage container including the UAV is conveyed by the conveyance system to a second testing area in the storage facility wherein structural integrity of an airframe of the unmanned aerial vehicle is assessed.

9. The system according to claim 8, wherein the storage container including the UAV is conveyed by the conveyance system to a third testing area in the storage facility wherein propellers of the UAV are rotated so as to monitor a vibration of the unmanned aerial vehicle.

10. The system according to claim 7, wherein the conveyance system comprises an automated guided vehicle (AGV), a robot, or conveyor belt, or any combination thereof for transporting the storage container to its intended location in the storage facility.

11. The system according to claim 7, wherein the storage container comprises vents, and wherein the storage facility comprises a cooling system comprising an air duct configured to be aligned with said vents.

12. A system for storing one or more unmanned aerial vehicles, comprising:
one or more shelves attached to a holding structure, each shelf of the one or more shelves (i) being configured to support a storage container configured to store an unmanned aerial vehicle (UAV), and (ii) defining a shelf area configured to receive the UAV, wherein the storage container includes a lid covering a top portion of at least one of the one or more shelves;
an electrical charging station configured to charge one or more electrical batteries of the UAV of each of the one or more shelves, while the UAV is being supported by the corresponding shelf; and
a data transfer and storage system configured to transfer and store flight data that is previously stored in a data storage device of the UAV of each shelf of the one or more shelves in a data storage unit, while the UAV of each shelf of the one or more shelves is being supported by the corresponding shelf, the flight data being accrued during a flight of the UAV and including data characterizing information of a mission,
wherein the storage container is configured to be handled by a conveyance system and conveyed to one or more testing areas such that the UAV can be evaluated.

13. The system according to claim 12, wherein the shelf area of each of the one or more shelves are configured to protect the supported UAV.

14. The system according to claim 12, wherein the electrical charging station comprises a cooling system configured to cool the one or more electrical batteries of one or more UAVs of the one or more shelves during a charging process of the one or more electrical batteries to keep the one or more electrical batteries cool.

15. The system according to claim 12, wherein the data transfer and storage system comprises a cooling system configured to regulate a temperature of the data transfer and storage system.

16. The system according to claim 12, wherein the UAV of each of the one or more shelves comprise the one or more electrical batteries and one or more data storage devices, the one or more electrical batteries being configured to house the one or more data storage devices.

17. The system according to claim 12, wherein the flight data previously stored in the data storage device of the UAV of each of the one or more shelves is transferred to the data transfer and storage system wirelessly.

18. The system according to claim 12, further comprising a detection system configured to inspect a structure of at least one UAV of the one or more shelves.

19. The system according to claim 18, wherein the detection system comprises a thermal sensor, an x-ray system, an ultrasound system, a visualization camera, or any combination thereof.

20. The system according to claim 12, further comprising indicator lights attached to the one or more shelves, the indicator lights being configured to indicate a location of an edge of the one or more shelves.

* * * * *